July 8, 1958

P. GIRAUDET

2,842,263

SUPPORTING BOX FOR ARTICLES, METHOD AND MEANS FOR ITS MANUFACTURE

Filed Nov. 1, 1954

INVENTOR
Pierre Giraudet

INVENTOR
Pierre Giraudet

INVENTOR
Pierre Giraudet

July 8, 1958           P. GIRAUDET           2,842,263
SUPPORTING BOX FOR ARTICLES, METHOD
AND MEANS FOR ITS MANUFACTURE
Filed Nov. 1, 1954           7 Sheets-Sheet 4

INVENTOR
Pierre Giraudet

July 8, 1958 P. GIRAUDET 2,842,263
SUPPORTING BOX FOR ARTICLES, METHOD
AND MEANS FOR ITS MANUFACTURE
Filed Nov. 1, 1954 7 Sheets-Sheet 5

INVENTOR
Pierre Giraudet

July 8, 1958

P. GIRAUDET

2,842,263

SUPPORTING BOX FOR ARTICLES, METHOD AND MEANS FOR ITS MANUFACTURE

Filed Nov. 1, 1954

INVENTOR

Pierre Giraudet

July 8, 1958  P. GIRAUDET  2,842,263
SUPPORTING BOX FOR ARTICLES, METHOD
AND MEANS FOR ITS MANUFACTURE
Filed Nov. 1, 1954  7 Sheets-Sheet 7

INVENTOR
Pierre Giraudet

2,842,263

SUPPORTING BOX FOR ARTICLES, METHOD AND MEANS FOR ITS MANUFACTURE

Pierre Giraudet, Ancenis, France, assignor to Satem S. A. Societe Anonyme: Societe d'Application Technique d'Emballages Modernes, Agadir, Morocco Application November 1, 1954, Serial No. 465,891

Claims priority, application France November 9, 1953

2 Claims. (Cl. 206—65)

This invention is filed under the priority of application for Letters Patents in France under No. 657,810 of November 9, 1953, and additions Nos. 53,586 of April 15, 1954, and 53,806 of June 8, 1954, is also a continuation in part of the above application.

The invention concerns a supporting-box partly open at the top and completely open at the bottom, for the packing and/or presentation of articles. The word "articles" as here used, comprises, among other things, articles such as: fragile articles, in glass, electric or pharmaceutic ampules, bottles, or products such as eggs, fruits, flowers, onions, as well as any article manufactured in round, ovoid or any other shape, as for instance: balls, tennis or golf balls, soaps.

One aspect of the supporting-box, in conformity with this invention, is characterized in that it is: (1) realized without any gluing or clasping, starting with a cardboard blank, (2) is made preferably of one piece, preferably a rectangular one properly cut-out and grooved, (3) is made by the raising on both sides of the bottom plane surface of this blank—according to folding lines parallel to the longitudinal axis of this bottom plane surface—of both right and left parts of the blank, which thus forms two right and left longitudinal walls integral with the bottom, (4) is made by the raising between these walls—according to folding lines perpendicular to the longitudinal axis of said walls—transversal partitions which are cut in the bottom plane surface and which thus are integral therewith; (5) by the folding and flanging towards the interior, according to folding lines parallel to the before-mentioned longitudinal axis, and separating the longitudinal walls, the extreme parts of these walls being each provided with cut-out openings placed in a row side by side next to the other, (6) by an additional flanging, the slits (or slots) provided therefor on the border of the longitudinal walls are imbricated into the corresponding slots (or slits) provided in transversal partitions, thus settling the limits of the compartments and thus forming the openings therein "bearing interior longitudinal walls," being one opposite to the other thus suitable for reception therein of the articles.

In this manner, both the right and left exterior longitudinal walls have been constituted solid respectively (by folding) with the right and left upper longitudinal borders and with the right and left bearing interior longitudinal walls.

As an example, and without limiting this invention thereto, the specifications will be made in reference to a supporting-box for the reception of articles such as eggs.

It is already the practice in trade to place fragile articles or products such as eggs, for instance, in a suitable egg-box provided with cells, one or several faces of each cell are constituted by the exterior walls of the box, so that any shock or pressure applied upon these walls is transmitted directly to the eggs, and this represents a great inconvenience.

Whereas, according to the present invention, the supporting-box is characterized particularly in that the articles are, at the same time, suspended in holes or openings provided in the bearing interior longitudinal walls, and are imprisoned therein, in a position insulating and keeping them away, at a suitable distance one from each other, and each one from all the exterior walls and/or imaginary planes passing through the upper and bottom edges of these walls, and thus enables the free air circulation for ventilation and/or cooling and/or heating purposes.

The supporting-box, according to this invention, has neither bottom nor lid properly so-called, since the bottom of the supporting-box, according to this invention, due to the flanging of the transversal partitions, allows to conserve only a very small portion of the initial surface serving only to connect the exterior longitudinal walls with the transversal partitions. The two exterior longitudinal walls, the two bearing interior longitudinal walls and the transversal partitions, are inclined in reference to the bottom plane surface under an angle, preferably a right angle, so that such walls and partitions are perpendicular to the bottom plane surface. The result therefrom is, on the one part, a remarkable resistance to crushing, and, on the other part, a great and almost complete visibility, underneath as well as above, of the articles therein packed, permitting also the checking or candling of the eggs or fruit, without taking them out of the supporting-box, and this could be done by means of natural light-rays, or electric or any other. The perfect visibility permits the utilization of this supporting-box, not only for conveyance, storage, distribution or transportation of fragile articles or any others, but also to use it as a means of presentation.

The supporting-box can be put in any position whatever, for instance turned over, without any danger of loss of its contents. According to another feature of this invention, the articles may be placed in the supporting-box at the very time of the folding and mounting of the supporting-box, and this presents a novel packing process, a considerable advantage in the general handling, and permits the inviolability of the supporting-box.

The supporting-box may first be terminated, and thereafter the articles may be placed therein by slight temporary deformation of the supporting-box. The openings designed for reception of the articles may have a suitable shape, they may be closed or more or less open at their tops.

In conformity with this invention, the articles may be removed from the supporting-box, either:

(1) By slightly deforming the bearing interior longitudinal walls by a finger pression, this permitting the re-utilization of the supporting-box and the removal of some of the articles;

(2) By partially dismounting the supporting-box;

(3) By tearing a suitable part of the supporting-box, for instance the transversal partition at the bottom of the supporting-box.

This supporting-box may have the shape of a rectangular parallelogram, ideal volume for storage permitting a perfect piling together of two or several supporting-boxes. It is also possible to give to its exterior walls an inclination towards the base or bottom plate surface. The surface or surfaces of the exterior longitudinal walls, as well as the upper longitudinal borders of the supporting-box may be printed at will for publicity purposes or they may be pierced with plurality of holes for publicity or utility purposes.

Another advantage of the supporting-box resides in the possibility of gluing a slip of paper or other, connecting the two upper longitudinal borders, eventually bearing a seal of guarantee of the inviolability of the supporting box before use.

This invention will now be described in respect to a specific example.

It is obvious that those skilled in the art, may well modify the shape, the sizes and the relation of the respective angles between the exterior walls, the interior walls, the top borders, the transversal partitions, etc. as well as modify the forms of open on one side cut-outs, the forms of slots, the forms of slits, the forms of openings, any other modifications of this kind, while remaining within the scope and object of this invention.

This invention will be better understood by the illustrations on Figures Nos. 1 to 23, not limiting nevertheless this invention thereto.

A supporting-box may also be fabricated in such a manner that the longitudinal axis of the egg is at the same time inclined in respect to the bottom plane surface of the supporting-box and inclinded in respect to the vertical axis of the box.

An example non-limiting this invention thereto, is described hereafter, showing one of the numerous possible forms of its execution.

Figure 1:
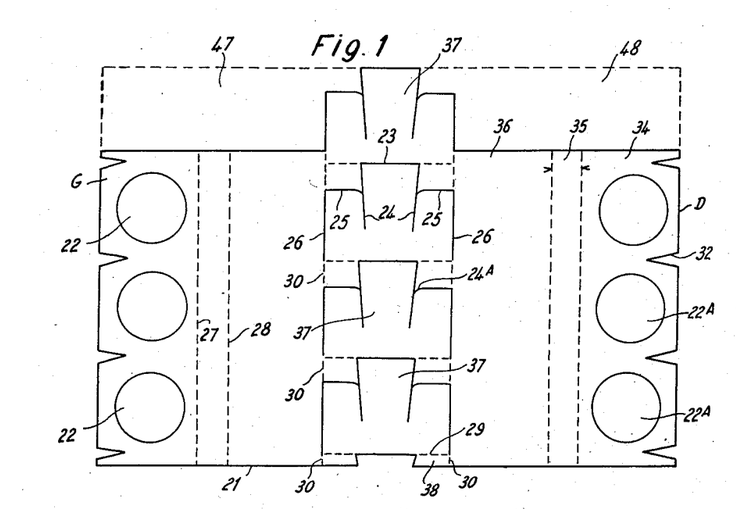
Figure 1 is a plan-view of the blank of one aspect of this invention.

A blank 21 Fig. 1 is chosen in a desired material, for instance paper, cardboard, cardboard strengthened with metal wire or textile, plastic material, cellulose, fabric impregnated with plastic or elastic material, etc.

This blank, being all in one piece (although it may be formed of one or several blank parts glued together) is cut and traced according to the outline of the drawing of Figures 1, 4, 6, 18 and 19.

According to this invention, the blank 21 is provided with apertures, or receiving holes 22 on the left side side (G) and 22A on the right side (R) of this blank, these apertures being designed for reception and containment of the articles. The apertures may be of a circular shape as is shown on Fig. 1 to 10, or of any other shape suitable for the reception and the maintenance of the articles in a proper snugly confining state of suspension by contacting them in the neghbourhood of their extremities in respect to their longitudinal transversal or vertical axis, as the case may be.

Figure 11:
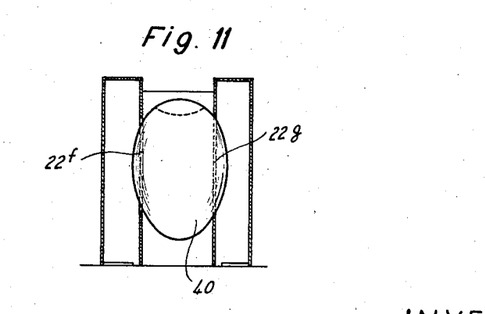
Figure 11 represents a transversal section view of another type of the supporting-box.

These apertures may be for instance of an elliptic shape Fig. 11, 22f and 22g or rectangular, triangular, hexagonal, etc. not illustrated, or of another continuous closed outline, or even of an outline open towards the top 22F or towards one side 22G. Figs. 6 and 7, Figs. 18, 19 and 20, or towards the bottom, by means of a slit or a suitable cutting, or a slot of a suitable form, illustrated partially.

Figure 23:
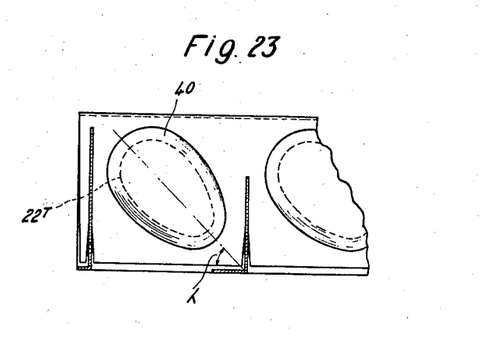
Figure 23 shows a longitudinal sectional view of a portion of another special type of the supporting-box.

Another aspect of this invention consists in a supporting-box Fig. 23 where the eggs 40 are placed so that their longitudinal axis 60 be inclined in respect to the longitudinal axis 61 of the box under the angle $\lambda$ of 30° to 75° and preferably about 60°.

This position enables the maintenance of the eggs such as described hereinabove, Figs. 21 and 22.

It is obvious that in order to maintain the eggs in this position, it is necessary that the openings or receiving holes 22T be of an irregular oval form as defined by the intersection of the bearing longitudinal interior walls of the box with the surface of the eggs 40.

This conception of the invention permits the realization of a less wide box, and at the same time, permits an easier extraction of the articles therefrom.

Figure 2:
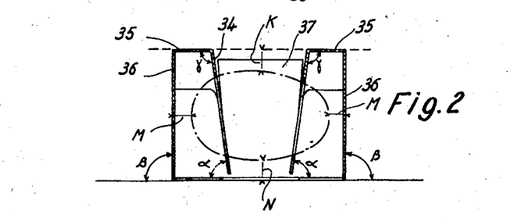
Figure 2 is a sectional side-view of the supporting-box made with the blank of Figure 1.
Figure 3:
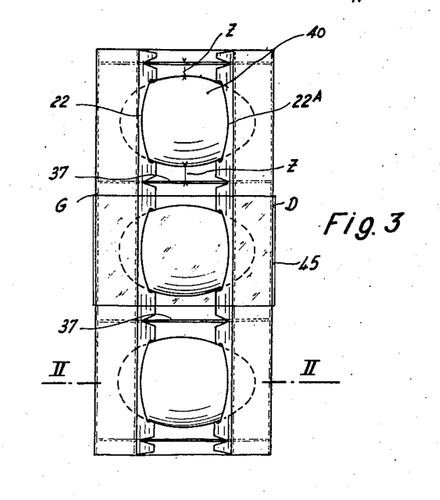
Figure 3 is a top view of Figure 2.

On Figs. 1, 2 and 3, the two groups of openings left 22 and right 22A, are shown as identical and having the same sizes.

Figure 6:
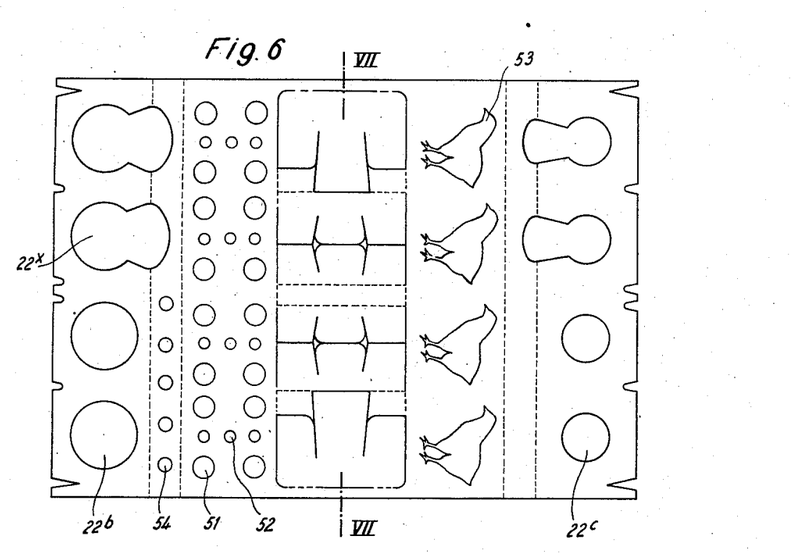
Figure 6 is the plan-view of the blank, showing another variation of the invention.
Figure 7:
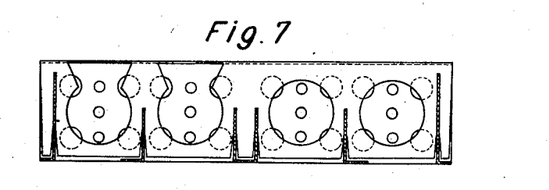
Figure 7 is the sectional view of the supporting-box made with the blank of Figure 6 according to the sectional line VII—VII.
Figure 8:
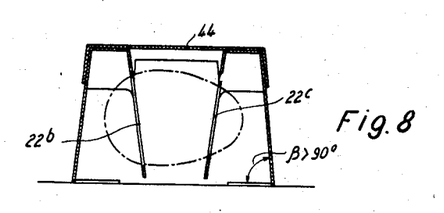
Figure 8 represents a transversal sectional view of another variation of this invention.
Figure 9:
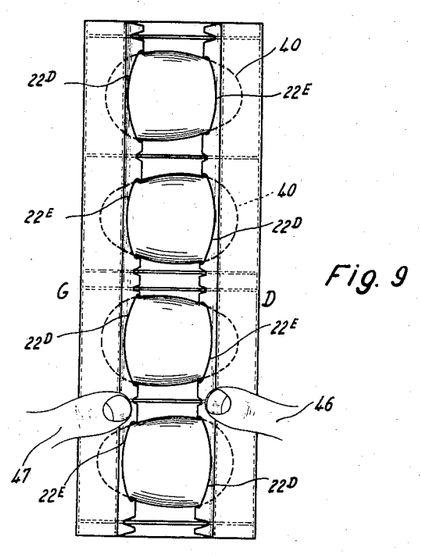
Figure 9 represents a top view of a supporting-box in another aspect of this invention.

According to this invention, these groups may be of different sizes, for instance as shown on Figs. 6, 7 and 8 where the openings 22b left are all larger than the right ones 22c where, as shown on Fig. 9, the right and left openings may be alternated, for instance 22D large and 22E small, 22D large, and so on, for the left side seen from the top, whereas for the right side seen from the top first 22E small, then 22D large, and so on.

This arrangement permits the placing of the eggs with their small end in the small aperture 22E and their big end in the large aperture 22D as shown on Fig. 9.

Such an alternated arrangement of the eggs in the supporting-box permits the reduction of its longitudinal size.

Figure 4:
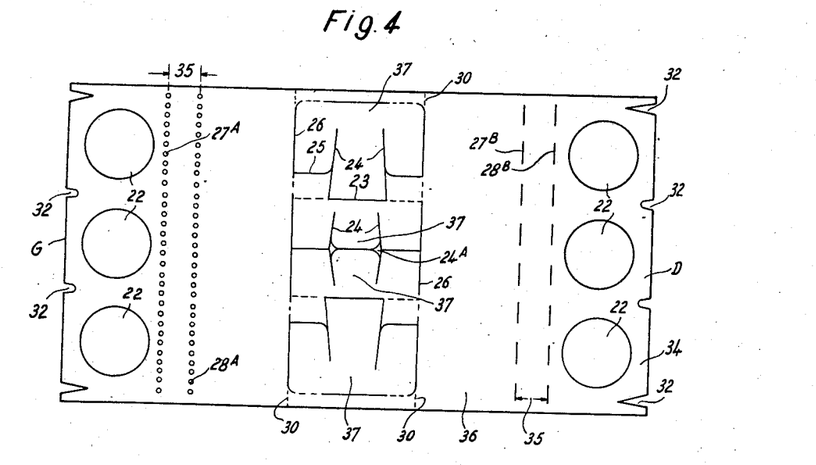
Figure 4 is a plan-view of the blank of another variation of this invention.
Figure 5:
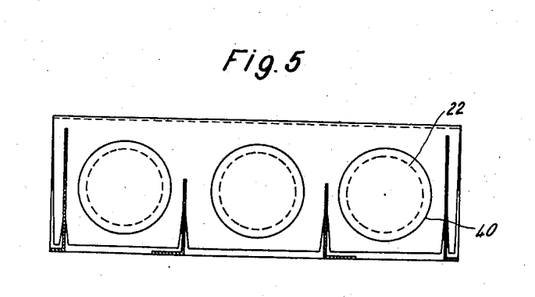
Figure 5 is the sectional view of the supporting-box made with the blank represented on Figure 4.
Figure 18:
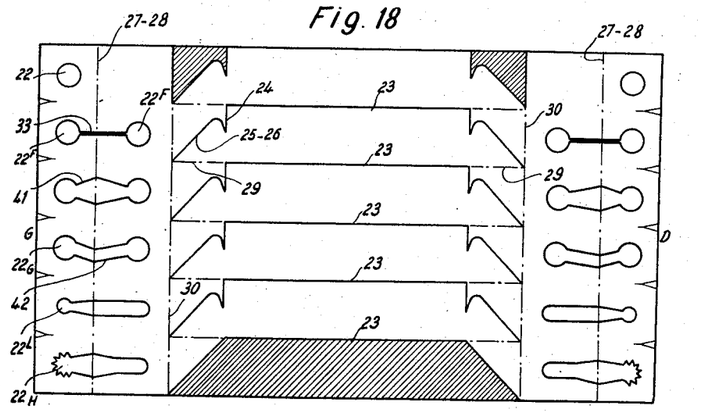
Figure 18 is a plan-view of a blank of another type of this supporting-box.
Figure 19:
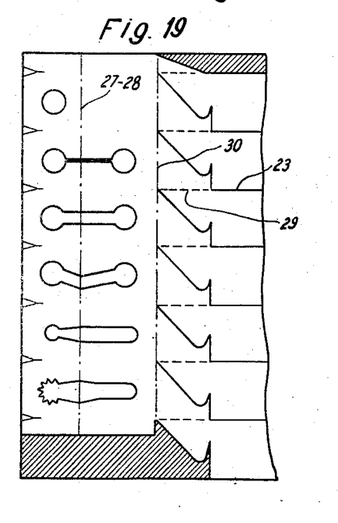
Figure 19 is a plan-view of the blank cut in part representing another type of the supporting-box.

One or several of the slits may be without any width, namely, mere incisions, or they may be cut in by removal of the material of a narrow width, for instance 0.3 mm. to 2 mm. according to lines 23, 24, 25, 26 Fig. 4, Fig. 18 and Fig. 1.

The folding lines are grooved, or are lightly traced according to lines 27, 28, 29 and 30 as shown in dotted lines, Figs. 1, 4, 18 and 19.

Instead of folding lines, very small holes 27A and 28A, Fig. 4, or small intermittent incisions 27B, 28B, Fig. 4, may be provided at a suitable distance to facilitate the folding.

The slots 32 are provided on the right and left extremities D and G of the blanks and destined to be inserted on each side of the slits 24, which slits, if desired, may be provided at their exterior ends with little slots 24A.

Figure 20:
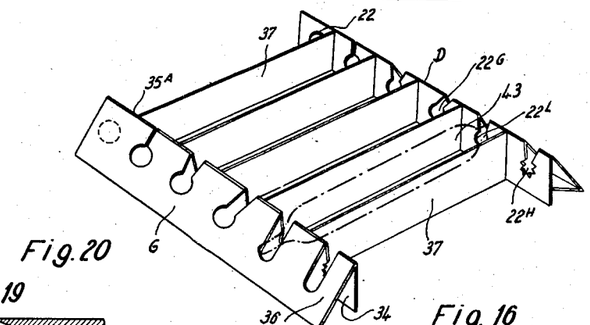
Figure 20 represents a view in perspective of a supporting-box fabricated with the cutting 18.

When the folding is made, the result is: the bearing interior longitudinal walls 34 (one left and one right); the top borders 35 (one left and one right) which may be of any suitable width for instance from 0 to 3 mm. as shown on 35A, Fig. 20, or a desired width for instance from 10 mm. to 20 mm. as 35, Figs. 1 and 4; the exterior longitudinal walls 36 (one left and one right). The angles between these elements 34, 35, 36 and the bottom plane surface 38, may be either of 90°, or a little larger or smaller than 90°, according to the shape to be given to the supporting-box.

A commendable solution but not limiting is $\alpha$=about 85°; $\beta$=90°; $\gamma$=95°. The top plan formed by 35 being parallel to the bottom 38, therefore horizontal.

The transversal partitions 37, preferably perpendicular to the bottom plane, are inserted into the bearing interior longitudinal walls by means of respective slits 24 or incisions in the slots 32, thus these walls are properly held in these slits and need no bluing or clasping. It is obvious that all these slots such as 32 and others may be replaced by simple incisions, whereas the incisions such as 24 and others, may be replaced by slots.

The articles, for instance eggs or bulbous roots and the like, are placed as shown on Figs. 2 and 3. Nevertheless, if desired, the eggs 40 may be placed vertically (as shown on Fig. 11) which represents the same section as Figs. 8 and 2, for instance the big end of the egg on top instead of placing them longitudinally, as shown on Figs. 2 and 3. This arrangement will permit the fabrication of a narrower supporting-box as shown on Fig. 11, but it will obviously become a little higher.

In this latter case, the openings 22f and 22g may be equal and may be either circular, or oval, or elliptic and matched with the respective contours of the corresponding surfaces of the articles for instance eggs.

One of the most important objects of this invention includes the four following characteristics:

Firstly, the articles, for instance eggs, thus confined between the corresponding right and left apertures, opposite one to the other remain subjected to a light pressure caused by the elastic deformation of the material with which the box is made. Even in case of absence of this light pressure the openings may maintain them in suspension in their circumferences.

Secondly, between any point of the surface of the articles and the interior surface of the exterior walls 36, there always is an air-pocket of the desired size M as shown on Fig. 2, for instance for eggs from 2 mm. to 10 mm. or more.

Thirdly, between the surface of the articles and the transversal partitions 37, a desired distance Z, Fig. 3 may be reserved, thus permitting an air-pocket of the desired thickness.

Fourthly, between the surface of the articles and the imaginary surfaces passing through the top and the bottom planes of the box, there are equally provided two air-pockets of a desired thickness respectively K and N, Fig. 2.

This peculiarity of this invention permits a unique new packing and presentation medium—a rather strong shock on the box is not transmitted to the articles confined therein, owing to the air-pocket. If the box falls down, it is the box which receives first the shock but not the articles directly.

Furthermore, the box may be placed in any position and on any of its sides whatever, the articles confined therein will not be submitted to any displacement or risk. The box is sufficiently rigid and at the same time sufficiently elastic owing to its particular conception; it is moreover very economical.

This invention also covers the use of the supporting-box for articles requiring no air-pocket; in this case M and/or N and/or K shown on Fig. 2, should be equal to zero mm.

The outline of the supporting-box seen from the transversal side may be rectangular Figs. 2, 3, trapezoidal Fig. 8 or any other form, according to requirement.

The width of the upper longitudinal border 35 may be nearly zero in thickness in the case of a supporting-box which does not require any top border. Such supporting-box will have only bearing interior longitudinal walls 34 and exterior longitudinal walls 36, as shown on Figs. 18, 19 and 20. This is particularly applicable for packing therein pharmaceutic ampules and bottles. In this case, the suitable openings may be either circular 22, or additionally provided with opening-extension or slit cut-out simultaneously in the interior walls 34 and in the exterior walls 37 as 22F, thus connecting together such a slit 33 with the opening 22F, or provided with a slot 41 instead of the slit 33, or provided with a side slot 42, or be in the form of 22L or 22H particularly suitable for pharmaceutic ampules 43, as is shown on Fig. 20.

Fig. 6 shows another variation of the openings 22X open towards the top and extending over a portion of the upper longitudinal border facilitating the placing into such a box and the removal therefrom of the articles.

Figure 12:
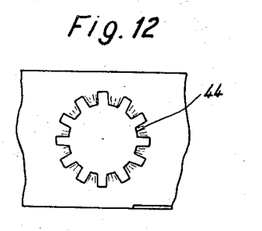
Figure 12 is a side-view of a portion of a supporting-box illustrating another kind of opening.
Figure 13:
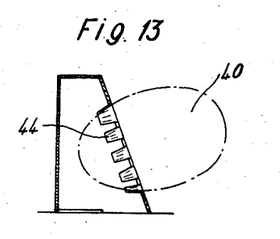
Figure 13 is a partial transversal section of Figure 12.

The openings 22 and the like herein described and illustrated may be provided with teeth 44 Fig. 12 and with a dental slot 22H as in Fig. 18, or cut-out tongues for instance of suitable size, thus permitting a rather flexible holding of the articles between these teeth or tongs slightly deformed by folding, as shown on Fig. 13.

Figure 14:
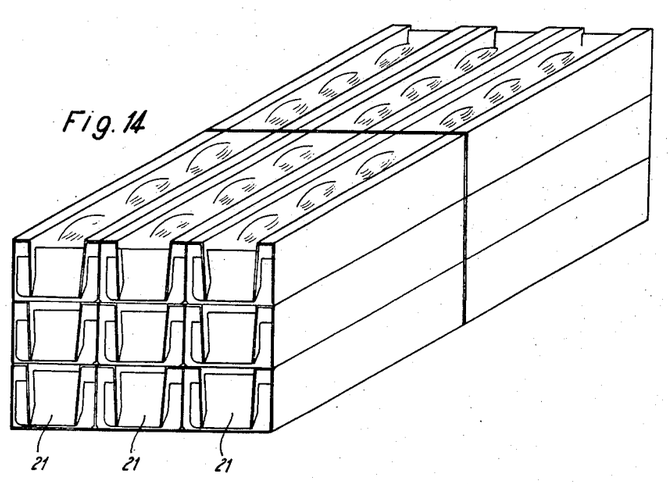
Figure 14 is a view in the distance of the piling up of the supporting-boxes.

The supporting-boxes 21 are easily piled up for storage as shown on Fig. 14.

The supporting-boxes may be of any length, for instance for the lodging of 3, 6 or more articles.

Figure 17:
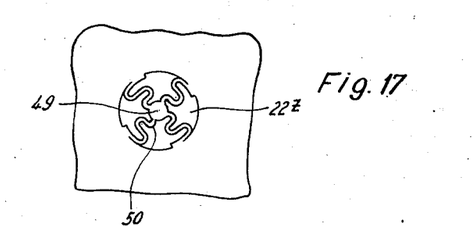
Figure 17 is a side-view of a portion of a supporting-box illustrating another kind of opening.

According to another aspect of this invention, instead of cutting the whole holes 22, they can be cut-out only in part as illustrated by the hole 22Z, Fig. 17. Such a partially cut-out hole will provide thereby a spring-type hole 50 composed for instance of 4 identical elements interconnected between them in the center by means on an element 49. The articles placed therein will deform such a spring-type hole 50 and will be elastically suspended therein.

Although the illustrations on Figs. 14 and 18 tend to show as a result boxes having solid exterior walls, this invention also permits the use, very often recommended, of exterior walls provided with decorative or other cut-out or small holes giving an aspect if desired of a net, or a lace and the like. For example the blank 6 is provided with groovings 51 and 52 or with cuttings in the form of articles, animals or others 53. The upper longitudinal borders may also be pierced with a plurality of holes 54. Such boxes permit a superior visibility, a better ventilation and a lesser weight.

A sealing band may be provided on the supporting-box according to this invention, either for the purpose of rigidity or as a guarantee-band. It may be applied by gluing or clasping and may be in form of a strip of paper 44, Fig. 8 or a strip of transparent material Fig. 3 which may bear inscriptions such as seals, dates and the like. It is obvious that any free surface of the supporting-box, visible or not, may be used for publicity printings.

This invention also permits the fabrication of supporting-boxes without any tracing or grooving of the folding lines 27, 28, 29 and 30, in which case the folding of the supporting-box is made upon suitable gaborit and/or forms.

It is obvious that any suitable apparatus for the rapid folding of the blanks such as hereinabove described, with or without any tracing and/or grooving, may be used to accelerate the folding and simultaneously the packing. One of such apparatus has been described in the French application for Letters Patent No. 657,810 and addition to it No. 53,585 hereinbefore referred.

Another advantage of this invention resides in the facility with which the eggs may be placed in the box or removed therefrom. The articles may be taken out, for instance either by tearing the partition 37, according to line 30, or as shown on Figs. 9 and 10, by deforming by a light pressure of the fingers 46 and 47, the bearing longitudinal walls in order to obtain the position shown in dotted lines on Fig. 10.

Figure 15:
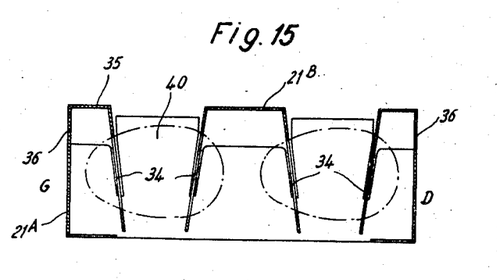
Figure 15 is a transversal sectional view of a double supporting-box.

The supporting-boxes may be made double when using two distinct blanks 21A and 21B Fig. 15: blank 21A, similar to blank 21 of Fig. 1 has a double transversal partition and the blank 22B contains 2 bearing longitudinal walls connected together by an upper border which, as an additional means and manoeuvre, are imbricated in the transversal partitions of 21A Fig. 15 which shows such a sectional double supporting-box. By the same process triple boxes may be made or compound boxes containing a greater number of rows.

Figure 16:
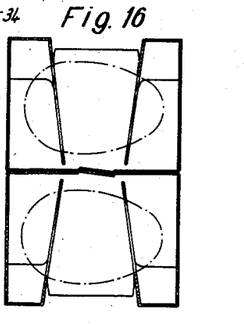
Figure 16 is a sectional view of another assembling type of 2 supporting-boxes.

Another process for the obtainment of multiple boxes consists in juxtaposing supporting-boxes such as illustrated on Fig. 2 and by binding, or gluing, or clasping or imbricating them together along the exterior longitudinal walls 36 or along the upper borders 35 or the bottom planes 38 as shown on Fig. 16. The blanks such as shown on Fig. 1 entail obligatorily the loss of part of material in falls 47 and 48 in order to obtain the 37 at the top of Fig. 1. It is in fact necessary to have at least one transversal partition in excess to the number of compartments (or the number of single articles) in order to separate the latter one by one, and to have moreover one transversal partition at each of the two longitudinal extremities of the supporting-box.

But one may, however, in view of economy of material set down the cutting in a rectangle without any falls other than cut-out falls for the apertures 22 and the slots; this may be achieved in various manners, for instance:

(1) By suppressing at least at one extremity of the blank the transversal partition 37, as shown in Fig. 18. In this case, the extreme compartments will not have any respective exterior transversal partition, as shown in Fig. 20.

(2) Or by suppressing a partition between two neighbouring articles, that is to say by raising the 2 cut-out adjacent partitions in the space perceptibly corresponding to these 2 articles.

(3) Or by cutting out in the space perceptibly corresponding to one article, 2 partitions having about a half-reduced size in height and raising them as shown in Figs. 4 and 6 illustrating thus a rectangular form.

Figure 10:
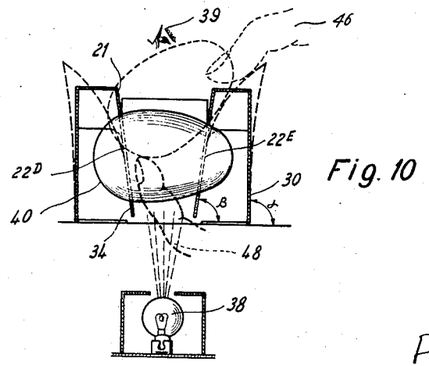
Figure 10 represents a transversal sectional view of a supporting-box with an egg-testing apparatus.

Fig. 10 shows a supporting-box placed in front of a source of light, for instance a lamp 38, to candle the eggs 40 i. e. to check them by looking at them by the eye 39. By using suitably selected rays, eggs and fruit may be well checked in regard to their freshness or quality.

Although this invention, as described, relates to boxes without gluing, it is obvious that, if desired, glue may be applied even on boxes such as those made from the blanks, Figs. 1, 2 and 4, and this in order to reinforce their rigidity. In place of gluing, clasping may also be used. Moreover, the same box exactly, may be made without deviating from the scope of this invention, in such a manner that in place of slots and slits and the like imbricating means, the bearing longitudinal inner walls and the transversal partitions are glued at some of their points of contact.

Although the supporting-boxes, subject of this invention, are by construction open at their top and at the bottom as described, they may, if desired, receive a top lid or cover and/or a bottom lid (bottom of the box) eventually made from a transparent material, which may be attached by glue or clasp or by means of imbrication by suitable tongs. The supporting-box may be wrapped up around its longitudinal axis with a sheet-material (eventually transparent) and the ends of it may be glued together.

This invention comprises a new packing process which comprises the making simultaneously on one part, the mounting-assembling of the supporting-box by folding of the appropriate blank as described and, on the other part, by placing into the supporting-box the articles during the course of its folding, the result of this process will permit the articles to be imprisoned in the apertures provided for them and will thus render the supporting-box inviolable.

This can be achieved at the time of folding of the bearing longitudinal interior walls 34 provided with apertures 22 for the article while just before the imbrication of these walls in the slots of the transversal partitions 38 is made, the extremities of the articles are placed in these holes, either by hand or by mechanical, electro-mechanical or pneumatical means and while terminating the folding and the respective imbrications these extremities and receiving holes are squeezed into and between the corresponding apertures, thus placing these articles snugly therein in a state of suspension. This process thus presents a really economical advantage for the packing industry.

Figure 21:
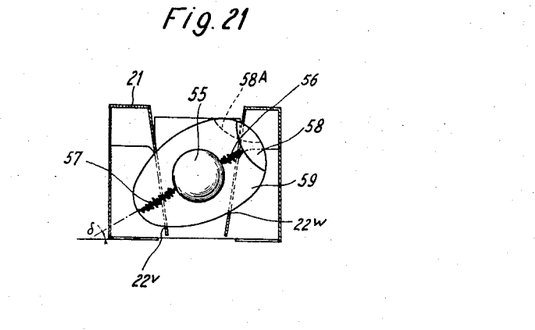
Figures 21 and 22 are sectional side-views of supporting-boxes of a special type in conformity with this invention.

Fig. 21 represents the use of box 21 such as illustrated in Figs. 1, 2, 3 or 4, but showing the position of the apertures 22V and 22W displaced differently in respect to the respective distances of their centers from the bottom of the supporting-box.

Accordingly another object of this invention consists in utilizing the supporting-box for the reception of eggs in an inclined position which may be considered as one of the best, and which consists in so placing the eggs, that its longitudinal axis forms an angle of 25° to 75° with the horizontal, thus the big end of the egg with the air-pocket will be placed in at the top.

Fig. 21 shows the egg which has a yolk 55 attached to the longitudinal extremities of the egg by ligaments 56 and 57; the air-pocket 58 and the white of the egg 59; the egg is shown in its preferential position with the big end at the top.

In the horizontal position, the yolk less dense than the white of the egg, will tend to go towards the top of the shell and will slightly and equally pull upon the ligaments. The air-pocket tends to unglue the membranes between which it is tightened and ascends to the top as a bubble tries to reach the level. As the eggs are usually packed, notably in the U. S. A., in the vertical position, the air-pocket on the top, it is therefore never subjected to any force capable of deforming it, but per contra, the yolk continuously pulls upon the ligaments and this is very prejudicial to the egg.

Placing the eggs into the supporting-box in an inclined position, which is one of the objects of this invention, will permit the air-pocket and the ligaments to be submitted only to diminished forces which will not injure the interior structure of the egg, because the air-pocket can only very slightly change its place—see 58A.

Figure 22:
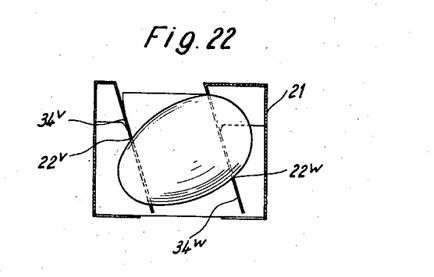

Fig. 22 shows a supporting-box for same use having its bearing interior longitudinal walls 34V and 34W inclined in a symetric manner suitable for articles, especially eggs when some are placed in the best before-mentioned slightly inclined position as hereinbefore described.

Equally the upper borders and eventually the exterior longitudinal walls may have different sizes on each side.

The contours of the holes 22V and 22W may be of a form oval, elliptic or other the best suitable, to match with the respective contours of the articles in order to obtain steadiness in the best possible position.

This invention also presents a new aspect of combination of the supporting-box with the eggs steady in a state of snugly suspensing in this box in their inclined position with the pointed egg-end towards the bottom and the big-end with the air-pocket towards the top.

The supporting-box may also have its receiving-holes so adapted that these holes are so situated in respect to the bottom surface of this supporting-box that the center of the first one of them is farther away from said bottom surface than the center of the second one, and that the line passing through said centers is inclined in relation to said bottom at an angle from 35° to 75°, said first receiving-hole being also adapted to receive the egg near its big end, and thus being slightly oval in form and larger in diameter than the second receiving-hole adapted to receive the egg near its pointed end. And additionally the said line passing through the before-mentioned centers, is also inclined from 30° to 70° in respect to the plane perpendicular to the plane of said bottom.

What I claim is:

1. An open bottom and open top cardboard rack for rigidly supporting elongated fragile articles at regions on opposite sides of the median part of the article while leaving the same visible from one direction completely, with the execption of said regions, and, from the opposite direction, along the said median part, said rack being formed of an integral blank, scored to form longitudinal fold lines dividing the blank into a central base panel, a pair of outer wall elements hingedly connected at one side to opposite sides of the central base panel, a pair of longitudinal marginal top strips, hingedly connected at one side to the other sides of the outer wall elements and a pair of inner wall elements hingedly connected at one side to the other sides of the longitudinal top strips, the inner wall elements having spaced pairs of opposed openings to receive portions of the articles, the central base panel having a plurality of slits therein extending along the longitudinal side edges thereof and a plurality of slits extending between the slits on the side edges defining a plurality of transversely extending partition-forming portions integral at one transverse edge thereof with the base panel and scored along said edge to provide a transverse hinge connection with the base panel, said partition-forming portions being turned upwardly from the base to form upstanding erect partitions extending between the pairs of article-receiving openings, and openings in the base beneath each pair of said article-receiving openings, the inner wall elements and the partitions having cooperating slits and notches extending from the free edges thereof in intersecting and interlocking relation, with the free edges of the inner wall elements terminating substantially in the plane of the base panel, the slits and notches in the partitions and in the inner wall elements cooperating with each other and with the weight of the articles when in said rack to provide a rigid, frictional edge-on-edge engagement of the inner wall elements with the partitions.

2. An open bottom and open top cardboard rack for rigidly supporting elongated fragile articles at regions on opposite sides of the median part of the article while leaving the same visible from one direction completely, with the exception of said regions, and, from the opposite direction, along the said median part, said rack being formed of an integral blank, scored to form longitudinal fold lines dividing the blank into a central base panel, a pair of outer wall elements hingedly connected at one side to opposite sides of the central base panel, a pair of longitudinal marginal top strips, hingedly connected at one side to the other sides of the outer wall elements and a pair of inner wall elements hingedly connected at one side to the other sides of the longitudinal top strips, the inner wall elements having spaced pairs of opposed openings to receive portions of the articles, the central base panel having a plurality of slits therein extending along the longitudinal side edges thereof and a plurality of slits extending between the slits on the side edges defining a plurality of transversely extending partition-forming portions integral at one transverse edge thereof with the base panel and scored along said edge to provide a transverse hinge connection with the base panel, said partition-forming portions being turned upwardly from the base to form upstanding erect partitions extending between the pairs of article-receiving openings, and openings in the base beneath each pair of said article-receiving openings, each of said partitions having a pair of spaced slits extending from the upper edge thereof downwardly through a major part of said partition and converging toward each other, said slits terminating short of the bottom edge of the partition and receiving the downwardly extending inner wall elements in spaced apart relation, said inner wall elements having notches in their free edges cooperating with the slits in the partitions to maintain the partitions in erect position, the inner wall elements having their free edges terminating substantially in the plane of the base panel, the incisions in the edges of said partitions and the notches in the edges of said inner elements cooperating with each other and with the weight of said articles, when in said rack, to provide a rigid, frictional edge-on-edge engagement of said inner wall elements with said partitions.

References Cited in the file of this patent

UNITED STATES PATENTS

| | | |
|---|---|---|
| 717,089 | Ferguson | Dec. 30, 1902 |
| 915,177 | Hilliker | Mar. 16, 1909 |
| 1,205,362 | Lang | Nov. 21, 1916 |
| 2,033,222 | Bergstein | Mar. 10, 1936 |
| 2,205,157 | Schrell | June 18, 1940 |
| 2,306,624 | Harris | Dec. 29, 1942 |
| 2,339,555 | Glass | Jan. 18, 1944 |
| 2,368,753 | Elliot et al. | Feb. 6, 1945 |
| 2,571,408 | Bergstein | Oct. 16, 1951 |
| 2,620,962 | Powell | Dec. 9, 1952 |
| 2,670,123 | Frankenstein | Feb. 23, 1954 |
| 2,700,456 | Gillam | Jan. 25, 1955 |
| 2,711,819 | Vander Lugt | June 28, 1955 |

FOREIGN PATENTS

| | | |
|---|---|---|
| 715,714 | France | Sept. 29, 1931 |
| 395,043 | Great Britain | July 13, 1933 |
| 907,533 | France | July 2, 1945 |
| 1,089,614 | France | Oct. 6, 1954 |